United States Patent
Hoppe

(10) Patent No.: US 7,378,809 B2
(45) Date of Patent: May 27, 2008

(54) CONTROLLER FOR CONTROLLING AN ELECTRIC MACHINE

(75) Inventor: Thomas Hoppe, Schwabhausen (DE)

(73) Assignee: Siemens Aktiengesellschaft, München (DE)

( * ) Notice: Subject to any disclaimer, the term of this patent is extended or adjusted under 35 U.S.C. 154(b) by 449 days.

(21) Appl. No.: 10/939,956

(22) Filed: Sep. 13, 2004

(65) Prior Publication Data

US 2005/0057202 A1   Mar. 17, 2005

(30) Foreign Application Priority Data

Sep. 15, 2003   (DE)   ............... 103 42 562

(51) Int. Cl.
   *H02P 1/18* (2006.01)
(52) U.S. Cl. .............. 318/254; 318/138; 318/439; 318/135
(58) Field of Classification Search ......... 318/254, 318/138, 439, 500, 135
   See application file for complete search history.

(56) References Cited

U.S. PATENT DOCUMENTS 3,787,716 A * 1/1974 La France ............ 318/135
4,906,923 A * 3/1990 Aoyama ............... 324/173
5,091,665 A   2/1992 Kelly
5,392,176 A * 2/1995 Anderson ........... 360/97.01
6,512,343 B1 * 1/2003 Yasohara .............. 318/437
6,815,847 B2 * 11/2004 Duncan et al. ............ 310/12

FOREIGN PATENT DOCUMENTS

| DE | 100 54 376 A1 | 9/2001 |
| EP | 0 902 918 B1 | 9/2000 |
| JP | WO2004/047258 | * 6/2004 |

OTHER PUBLICATIONS

Operating Manual Simudrive 611 digital and/or Sinumerik 840D/810D, Siemens AG, Dec. 2002.

* cited by examiner

*Primary Examiner*—Rina Duda
(74) *Attorney, Agent, or Firm*—Henry M. Feiereisen; Ursula B. Day

(57) ABSTRACT

A controller for an electric machine, in particular for a linear motor, is disclosed. The electric machine or linear motor includes a first machine section with windings and a second machine section with permanent magnets. The controller includes a memory which can store one or more physical parameters, such as magnetic field parameters, that can be used to control the electric machine. The physical parameter(s) can be determined by having the electric machine perform one or more reference passes.

12 Claims, 2 Drawing Sheets

CONTROLLER FOR CONTROLLING AN ELECTRIC MACHINE

CROSS-REFERENCES TO RELATED APPLICATIONS

This application claims the priority of German Patent Application, Serial No. 103 42 562.4, filed Sep. 15, 2003, pursuant to 35 U.S.C. 119(a)-(d), the disclosure of which is incorporated herein by reference.

BACKGROUND OF THE INVENTION

The present invention relates to a controller for an electric machine, in particular for a linear motor.

To ensure clarity, the term "electric machine" should not be limited in the disclosre to a linear motor, but should be construed to also include, for example, a torque motor or a synchronous motor or a synchronous generator.

Nothing in the following discussion of the state of the art is to be construed as an admission of prior art.

A motor controller and a method for controlling and operating electric machines, such as motors, to allow rapid and accurate control of movement of the electric machine is described, for example, in European Pat. No. EP 0 902 918 B1. The controller has a memory which stores at least one physical parameter, such as a magnetic field parameter, to control the electric machine or the linear motor. It is further known from U.S. Pat. No. 5,091,665 to provide a Hall sensor for determining the position of a machine or a machine section. The sensor for determining the position is hereby a separate element of the primary section.

Physical parameters of the afore-described type are described, for example, in Chapter 2 of the Operating Manual SIMUDRIVE 611 digital and/or SINUMERIK 840D/810D. An example of a physical parameter is a parameter that relates to the magnetic field of the permanent magnets. This parameter is referred to, for example, also as a force constant or a Force-Current-Ratio.

Technical advances require a much higher precision in controlling electric motors. If the underlying physical parameters on which the control of an electric machine is based change, then the quality of the control deteriorates. However, not every physical parameter that can be used to control an electric motor is subject to change during the operation of the electric machine. For example, the number of poles of the electric machine is a physical parameter which can be used in the controller. However, the number of poles will not change during operation of electric machine. However, this is different for, for example, the physical parameters that relate to the magnetization the permanent magnets. The strength of the magnetic field of permanent magnets can change, for example decrease, during the service life of the electric machine. The change in the magnetic field strength of permanent magnets of a motor section can also be influenced by environmental factors, for example an accumulation of dirt or of other magnetic materials that affect the magnetic field lines of the permanent magnets. Parameters that depend on the magnetic field strength of the permanent magnets and are stored in the controller for controlling the electric machine then no longer correspond exactly to the actual magnetic field strength produced by the permanent magnets.

As a result, the accuracy of the control of electric machine or the linear motor is changed. Moreover, a parameter then depends on the magnetic fields strength of a permanent magnet or on the air gap can be subject to manufacturing tolerances and therefore be from a corresponding parameter of a prototype of an electric machine or a linear motor.

It would therefore be desirable and advantageous to provide an improved controller for a motor and an improved method for parametrizing an electric motor, which obviates prior art shortcomings and is able to specifically allow a more precise control of the electric motor.

SUMMARY OF THE INVENTION

According to one aspect of the present invention, a controller for an electric machine that has a first machine section having windings and a second machine section having permanent magnets includes a memory capable of storing at least one physical parameter for controlling the electric machine, wherein the physical parameter is determined by having the first machine section perform a reference pass relative to the second machine section. The physical parameter is then stored in the memory.

According to another aspect of the invention, a method for parametrizing an electric machine includes the steps of operating the electric machine to perform a reference pass, measuring during the reference pass with at least one sensor a physical quantity of the electric machine and providing sensor values, forming from the sensor values a parameter, storing the parameter, and controlling the electric machine with the parameter.

Advantageous embodiments of the invention may include one or more of the following features.

The physical parameter can be a magnetic field parameter. A magnetic field parameter depends on the strength of the magnetic field produced by the permanent magnets. The magnetic field parameter can be derived from a sensor signal provided by a sensor. The magnetic field depends, for example, on the strength of the magnetization of the permanent magnets, but can also depend on the dimensions of an air gap.

The parameter stored in the memory for controlling the electric machine or the linear motor are either constant parameters having fixed values for the electric machine or the linear motor, or parameters that can change during the operation of the electric machine or the linear motor. Such changes in the parameter values can result, for example, from dirt, damage or wear, in particular following a loss or decrease in the magnetization of the permanent magnets. If a change in a parameter that controls the electric machine or the linear motor is detected during or following a reference pass of the electric machine or the linear motor, then this changed parameter can be stored, for example, in the controller and can be used for controlling the electric machine. Advantageously, the controller itself can include the memory for storing parameters, for example in form of internal hardware. Alternatively, external hardware, such as a memory card, can be used, or a data link to a memory located in the electric machine.

In the reference pass, the first machine section moves relative to the second machine section. For example, in a rotary machine, the rotor with permanent magnets represents the second machine section that rotates relative to the stator, which represents the first machine section. The rotary motion can include one or several revolutions, which can also include partial revolutions. For example, in a linear motor, the first machine section can be the movable primary section, whereas the second machine section can be the secondary section with permanent magnets. The primary section then moves across the secondary section in a reference pass. Advantageously, the primary section can moves across the entire length of the secondary section.

The measurement performed during the reference pass can identify contamination caused by, for example, chips, deposits, etc. Advantageously, actual parameters can be obtained during the reference pass which provide the possibility to set control parameters of linear direct drives in advance.

When a machine or a motor axis starts up, for example, an EMF measurement or a measurement of another physical quantity is performed in a reference pass. The measurement values can be stored, for example, in a converter or in an additional chip in the motor as a function of the position over the entire travel distance. The reference pass can be repeated periodically or as desired. The physical parameter stored in the memory can be updated with another physical parameter determined by having the first machine section perform another reference pass relative to the second machine section. The measurement curves of the actual value can be compared with the desired value. For example, discrepancies can be caused by at least one of the following underlying causes: "aging," "damage," "contamination," "demagnetization," "change of components", etc. Each of these causes can disturb the operation. An "alarm" can be triggered if the discrepancy exceeds a certain percentage value of, for example, the desired value.

Advantageously, the reference pass can also be used for calculating a "pilot control" value to compensate for ripple, variations in the force, and other abnormalities.

The magnetic field parameter depends on the field strength of the permanent magnet. The magnetic field parameter can be, for example, a value of the electromagnetic force (EMF).

According to another advantageous embodiment of the invention, the electric machine can include a sensor connected with the controller, wherein sensor measuring a magnetic field. This embodiment represents a system with an electric machine, such as a linear motor, a controller and a sensor, wherein the controller has a memory for the control parameters. The system provides a connection between at east the controller and the sensor to enable data transfer therebetween, so that the parameters of controller, in particular those parameters that can change in an electric machine or a linear motor, can be automatically checked and set.

According to an advantageous embodiment, the electric machine or the linear motor includes a memory for storing the parameters and is connected for data transfer with the controller, so that the memory of the electric machine can also operate as memory for the controller, thereby providing the controller with an external memory.

The reference pass for determining a physical parameter can be performed either actively by the electric machine or the linear motor itself or passively as a result of external actions. If the reference pass is performed actively by the electric machine or the linear motor, then interference signals can be compensated by compensating the currents that flow through the electric machine or the linear motor.

For a passive reference pass, one machine section is moved relative to the other machine section. In an electric machine that performs a rotation, for example, the rotor has permanent magnets and represents the second machine section that moves as with respect to the first machine section, in this case the stator. In a linear motor, for example, the first machine section represents the primary section that moves relative to a second machine section. The second (secondary) machine section has permanent magnets which define the linear travel path of the linear motor.

According to another advantageous embodiment, the sensor measures a magnetic field, in particular the magnetic field of the permanent magnets. A parameter for the electromagnetic force is formed from the measured values which can be stored. The parameter can be used in a controller of the electric machine, in particular a linear motor, for controlling the electric machine or the linear motor.

According to yet another advantageous embodiment, several parameters, in particular magnetic field parameters are calculated. These parameters can vary as a function of the location. Advantageously, each parameter is location-dependent. In other words, the parameter is measured as a function of the location and stored. This increases the control accuracy of the electric machine.

According to another advantageous embodiment of the method of the invention, the reference pass is performed at prearranged times, for example, periodically; examples of such prearranged times are the startup of the machine, a scheduled maintenance time, a particular error message or other predetermined intervals of reference passes expressed, for example, in hours, days, weeks or months.

The parameter, in particular the magnetic field parameter, can also be stored in a memory, i.e., a data memory of the electric machine or the linear motor. The controller is in data communication with the memory.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
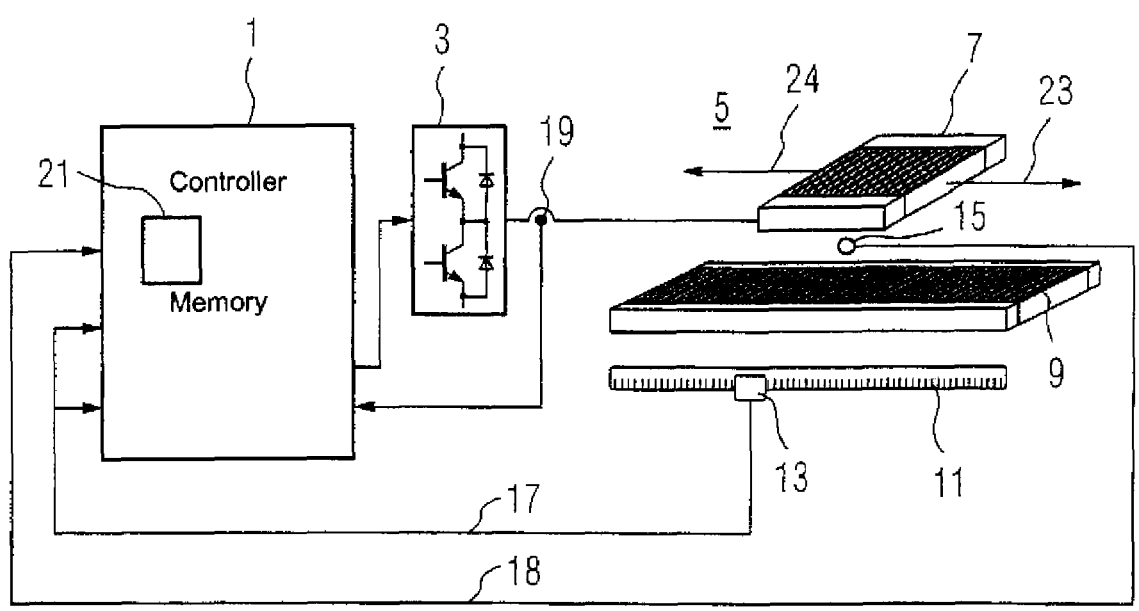
FIG. 1 shows schematically a linear motor, embodying the subject matter of the present invention.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a controller 1 which self-contained, i.e., the controller 1 is not connected to a network or to another external control unit. The controller 1 can be integrated, for example, in a production machine, a machine tool or a robot. These machines and/or robots are not shown and FIG. 1. The controller 1 can control a converter 3 which can provide electric power to an electric machine, such as the depicted linear motor 5, which is just one example for an electric machine. The linear motor 5 has a conventional configuration with a primary section (reaction section) as first machine section 7 and a secondary section (stator) as second machine section 9. The linear motor 5 can also include a linear measuring scale 11 and a transducer 13, as indicated schematically in FIG. 1. Another sensor 15 is arranged on or in the force transmitting interface of the linear motor 5, i.e., in the region of an air gap between the primary and the secondary section. The sensor 15 measures the magnetic field of the second machine section that includes permanent magnets. Additional sensors, such as a velocity sensor, which are typically found in electric machines and linear motors, can also be provided, but have been omitted from FIG. 1 for sake of clarity. In another arrangement, the velocity can also be measured by measuring the time dependence of the magnetic field at the location of sensor 15. In other words, an existing sensor already provided in an electrical machine or a linear motor can advantageously be used with the system of the invention. The transducer 13 and the sensor 15 are connected with the controller 1 via a link 17 and 18, respectively. The controller, which can also be capable of controlling the velocity, the position and/or the current, uses at least the values measured by the sensor 15 to generate a parameter for at least one of the aforedescribed control units. An additional current sensor 19 can provide a current signal, which can also be used for controlling the linear motor 5.

FIG. 1 shows the linear measuring scale 11 as being separate from the linear motor 5. However, the linear measuring scale 11 can also be located in the air gap between the two machine sections, i.e., where the force is transmitted. The position and velocity information can also be derived from the electromagnetic field instead of from the linear measuring scale 11.

The controller includes a memory 21 which is used to store parameters that relate in particular to the electromagnetic force EMF. In a reference pass of the linear motor 5, the first (primary) machine section, i.e., the section with the windings, moves at least in one of the two travel directions 23, 24, or also sequentially in both travel directions 23, 24, as indicated by the arrows. During the reference pass, the sensor 15 acquires measurement data which are processed to provide at least one parameter. The parameter is stored and used for controlling the electric machine, such as a linear motor or a torque motor (not shown).

Figure 2:
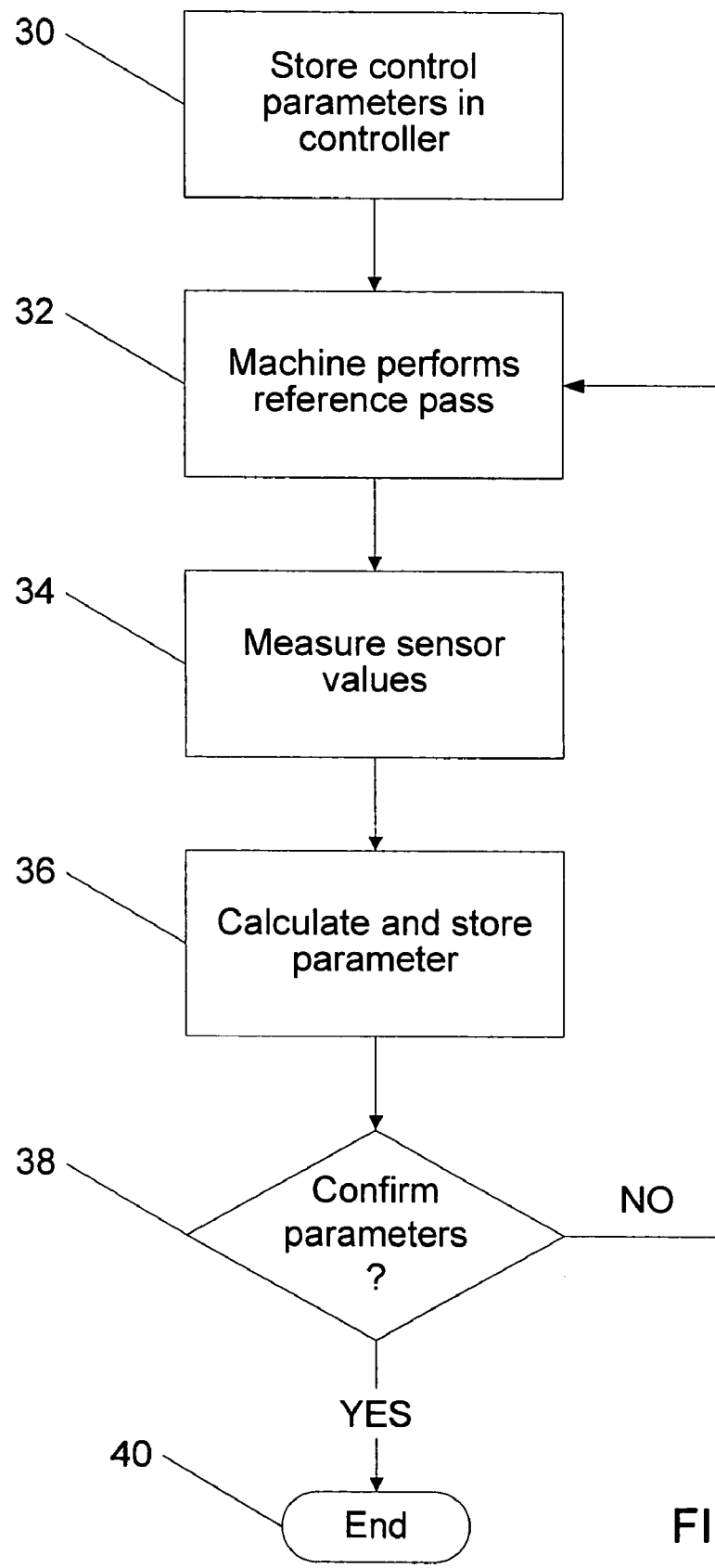
FIG. 2 shows a flow diagram of a process for parametrizing an electric machine in accordance with the present invention.

The diagram of FIG. 2 shows a flow diagram of a method for parameterizing an electric machine, in particular a linear motor. The parameters are set by a controller, including a stored program controller or a motion controller of a control unit. The parameters that control the electric machine or the linear motor are stored in the controller, step 30. In a following step 32, the electric machine or linear motor performs a reference pass, whereafter the measurement values of a sensor are measured, step 34. A parameter value for the controller is then calculated and stored, in step 36. If the stored parameter value is to be confirmed, step 38, then the process terminates in step 40; conversely, if the stored parameter value are to be changed, step 38, then the process returns to step 32 to perform an additional reference pass. The number of reference passes or the time intervals between the reference passes can be arbitrarily set, performed periodically and/or according to a maintenance schedule. By using a reference pass to obtain at least one parameter value, problems associated with time-consuming maintenance schedules and/or visual inspections and/or frequent removal of contamination or frequent replacement of a stripping device can be reduced.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A controller for an electric machine having a first machine section with windings and a second machine section with permanent magnets, said controller comprising a memory configured to store at least one physical parameter for controlling the electric machine, wherein the physical parameter is determined by having the first machine section perform a reference pass relative to the second machine section and is stored in the memory, and wherein the determined physical parameter is compared with a desired value of the physical parameter and wherein a detected discrepancy between the determined and the desired physical parameter indicates a disturbance caused by at least one of aging, damage, contamination, demagnetization, and change of a component of the electric machine.

2. The controller of claim 1, wherein the physical parameter stored in the memory is updated with another physical parameter determined by having the first machine section perform another reference pass relative to the second machine section.

3. The controller of claim 1, wherein the electric machine comprises a sensor connected with the controller, said sensor measuring a magnetic field.

4. The controller of claim 1, wherein the physical parameter comprises a magnetic field parameter.

5. The controller of claim 3, wherein the physical parameter comprises a magnetic field parameter derived from a sensor signal provided by the sensor.

6. The controller of claim 1, wherein the electric machine comprises a linear motor.

7. A method for parametrizing an electric machine, comprising the steps of:
   operating the electric machine to perform a reference pass;
   measuring during the reference pass with at least one sensor a physical quantity of the electric machine and providing actual sensor values;
   comparing the actual sensor values with desired sensor values and determining a deviation between the actual sensor values and the desired sensor values,
   wherein the deviation indicates a disturbance caused by at least one of aging, damage, contamination, demagnetization, and change of a component of the electric machine.

8. The method of claim 7, wherein the physical quantity is a magnetic field, and the parameter is representative of a value of an electromagnetic force, and further comprising the step of controlling the electric machine with the parameter.

9. The method of claim 7, wherein a plurality of physical quantities are measured, with the physical quantities being a function of a location.

10. The method of claim 7, wherein the reference pass is performed at predetermined times.

11. The method of claim 7, wherein the parameter is stored in a memory of the electric machine.

12. The method of claim 7, wherein the electric machine comprises a linear motor.

\* \* \* \* \*